United States Patent [19]
Miles

[11] 3,859,131
[45] Jan. 7, 1975

[54] PROCESS INVOLVING OPTICAL THIN FILM FILTERS PROTECTED AGAINST DETERIORATION FROM HUMIDITY

[75] Inventor: John L. Miles, Belmont, Mass.

[73] Assignee: Baird-Atomic, Inc., Bedford, Mass.

[22] Filed: Oct. 16, 1972

[21] Appl. No.: 297,610

Related U.S. Application Data

[62] Division of Ser. No. 93,259, Nov. 27, 1970, Pat. No. 3,709,765.

[52] U.S. Cl. .............. 117/33.3, 117/43, 117/71 R, 117/107, 156/330, 161/147, 161/185, 161/186, 161/196, 161/408, 350/61, 350/67
[51] Int. Cl. .................. B29d 11/00, G02b 5/20
[58] Field of Search............ 117/43, 107, 71 R, 94, 117/33.3; 156/99, 107, 330; 161/1, 45, 147, 149, 186, 196, 408, 185; 350/61, 67

[56] References Cited
UNITED STATES PATENTS

| | | | |
|---|---|---|---|
| 2,793,148 | 5/1957 | West | 161/408 X |
| 2,917,439 | 12/1959 | Liu | 204/22 |
| 2,921,246 | 1/1960 | Peck et al. | 117/43 X |
| 3,253,331 | 5/1966 | Limansky | 29/473.1 |
| 3,267,007 | 8/1966 | Sloan | 204/15 |
| 3,340,224 | 9/1967 | Sherman et al. | 260/41.5 |
| 3,393,087 | 7/1968 | Kamp et al. | 117/26 |
| 3,549,466 | 12/1970 | Kay et al. | 161/39 |

Primary Examiner—Charles E. Van Horn
Assistant Examiner—Robert A. Dawson
Attorney, Agent, or Firm—Morse, Altman, Oates & Bello

[57] ABSTRACT

An optical thin film filter having a plurality of alternating high and low index dielectric layers sandwiched between a pair of substrates is protected against impairment from humidity by vapor deposition of a water impermeable metallized film about the exposed edges of the layers and substrates.

6 Claims, 7 Drawing Figures

PATENTED JAN 7 1975 3,859,131

PROCESS INVOLVING OPTICAL THIN FILM FILTERS PROTECTED AGAINST DETERIORATION FROM HUMIDITY

This is a division of application Ser. No. 93,259, filed Nov. 27, 1970, and now Pat. No. 3,709,765.

BACKGROUND OF THE INVENTION

1. Field of Invention

The invention relates to optical thin film filters and more particularly to a product and process involving the protection of such filters against damage from humidity.

2. Description of the Prior Art

Generally, optical thin film filters comprise a plurality of alternating high and low index of refraction dielectric layers. Since the dielectric materials are susceptible to deterioration from humidity, the filters are encapsulated by attaching a pair of glass cover plates at the exposed faces of the optical filter with an epoxy cement. Such encapsulated optical filters have suffered from the disadvantage that the edge of the cement layer is exposed and water contacts the multifilm filter by diffusion through this layer.

SUMMARY OF THE INVENTION

It is an object of the present invention to provide a product and process involving the protection of optical thin film filters against deterioration from humidity by preventing access of water to the exposed edges. The optical thin film filter is characterized by a plurality of alternating high and low index dielectric layers encapsulated between a pair of substrates and a water impermeable metallized film about its edges. The process includes the step of depositing by vacuum vapor deposition a water impermeable metallized film about the exposed edges of optical thin film filters. The product and process provide an optical thin film filter which is protected against deterioration from humidity.

The invention accordingly comprises the process and product involving the method steps and possessing the construction, combination of elements and arrangement of parts that are exemplified in the following detailed description, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings, wherein.

DETAILED DESCRIPTION OF THE INVENTION

Figure 1:
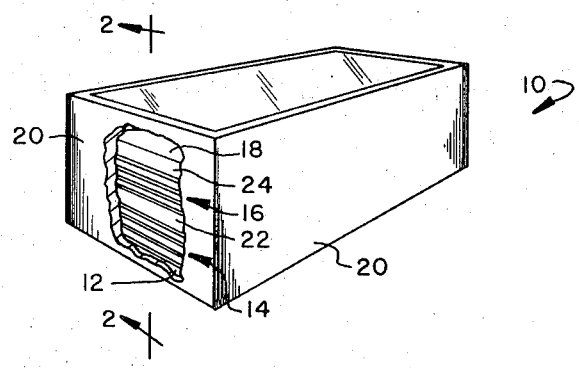
FIG. 1 is a perspective view, partly brokenaway and somewhat exaggerated, of an optical thin film filter embodying the invention.
Figure 2:
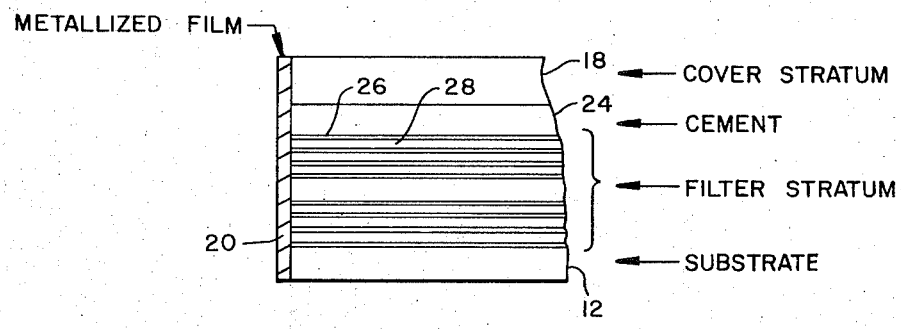
FIG. 2 is a section taken along the lines 2—2 of FIG. 1.

Referring now to the drawings, in particular FIGS. 1 and 2, an optical thin film filter embodying the invention is shown at 10. By way of example, optical filter 10 is a multilayer Fabry-Perot-type transmission filter in the shape of a rectangular module. Filter 10 comprises a base substrate 12, intermediate strata 14, 16, cover stratum 18, and metallized sidewalls 20. For best results, strata 14, 16 are formed on substrate 12 by a vacuum vapor deposition process and are separated by a one-half wavelength dielectric gap 22. Cover stratum 18, composed of glass for example, is attached to the exposed face of stratum 16 by means of an epoxy cement 24.

Each stratum 14 and 16 includes a sequence of alternating layers of high and low index of refraction materials 26 and 28, respectively, the thickness of each layer 26, 28 being one-quarter of a wavelength. Layer 26 is a high index of refraction dielectric selected from the group consisting of zinc sulfide, titanium dioxide, stibnite, cadmium sulfide, antimony trioxide, cessium iodide, germanium, tellurium, cerium oxide, lead chloride, and cessium bromide. Layer 28 is a low index of refraction dielectric selected from the group consisting of cryolite, flourite, lithium fluoride, magnesium fluoride, sodium chloride, and sodium fluoride.

Each metallized sidewall 20 is composed of a water impermeable material and is formed about the edges of substrate 12, intermediate strata 14, 16, epoxy cement 24, and cover glass 18 by means of a vacuum vapor deposition process. For best results, sidewalls 20 are composed of a metal that is readily evaporated in a vacuum and is sufficiently soft so as not to be under strain at room temperature. Each sidewall 20 is a water impermeable metal such as lead, indium, aluminum, chromium, gold, or tin. The following non-limiting example further illustrates the invention.

EXAMPLE

Figure 3:
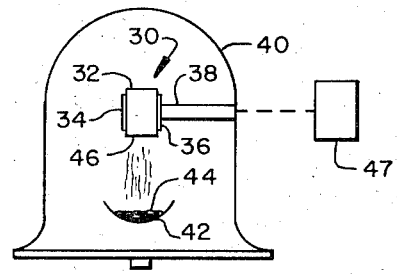
FIG. 3 is a side elevation of an apparatus for fabricating an optical thin film filter embodying the invention.

As shown in FIG. 3, an optical thin film filter 30, comprised of an intermediate stratum 32 of alternating layers of high and low index of refraction dielectrics interposed between a base substrate 34 and a cover glass 36, was mounted to a support 38 within a bell jar 40 in such a manner that one edge of the filter was in registration with the receptacle 42 containing a charge of lead 44. The exposed faces of substrate 34 and cover glass 36 were masked for protection against unwanted depositing of lead thereon. Bell jar 40 was evacuated to a pressure of approximately $10^{+5}$ Torr and lead 44 was evaporated by raising its temperature to approximately 900°C by resistively heating receptacle 42. A film of lead approximately 0.001 inch in thickness and defining a sidewall 46 of filter 30 was deposited on the edge of filter 30 opposite receptacle 42. Thereafter, support 38 was rotated by means of a driver 47 operatively connected thereto and another edge of filter 30 was aligned in registration with receptacle 42. The deposition process was repeated until all edges of filter 30 was provided with a metallized sidewall. Filter 30 was subjected to 22 days of testing in a humid environment and showed no deterioration as a result of such humidity.

Figure 4:
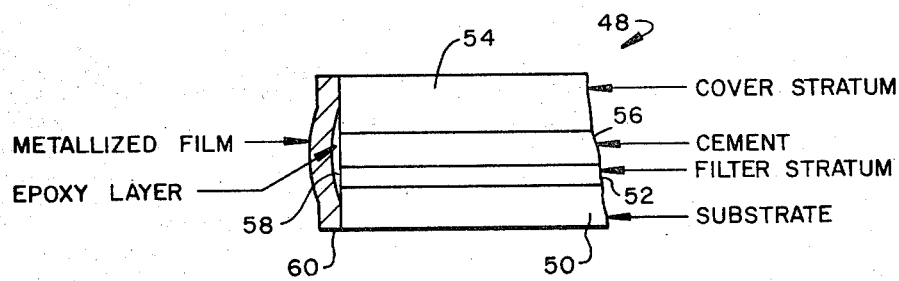
FIG. 4 is a sectional view in side elevation of a second embodiment of the invention.

Referring now to FIGS. 4-7, there are shown alternate embodiments of the invention. In FIG. 4, an optical thin film filter 48 comprises a base substrate 50, a filter stratum 52, and a cover stratum 54. Base substrate 50; filter substrate 52; and cover stratum 54 correspond to substrate 12; intermediate strata 14, 16; and cover stratum 18, respectively. Cover stratum 54 is attached to intermediate strata 52 by means of an epoxy cement 56 and an epoxy cement stratum 58 is applied to the entire exposed edges of stratum 52 and cement 56 and a portion of the exposed edges of cover stratum 56 and substrate 50 adjacent to stratum 52 and cement 56. Metallized sidewalls 60 which correspond to sidewalls 20 are composed of a similar material and are deposited on the exposed surface of stratum 58 and the exposed edges of substrate 50 and stratum 52. The function of epoxy cement stratum 58 is to provide a smooth adhesive surface for metallized sidewalls 60 and to fill depressions in the edges of stratum 54 or cement 56 that would prevent the exposed edges of filter 48 from being completely enveloped by metallized sidewalls 60.

Figure 5:
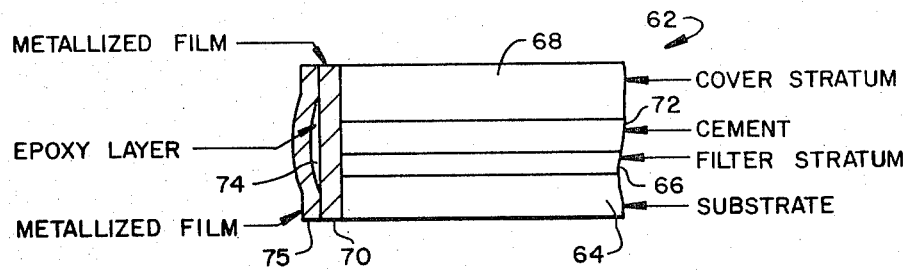
FIG. 5 is a sectional view in side elevation of a third embodiment of the invention.

In the embodiment shown in FIG. 5, an optical thin film filter 62 comprises a base substrate 64, a filter stratum 66, a cover stratum 68, and metallized sidewalls 70. Base substrate 64; filter stratum 66; cover stratum 68; and metallized sidewalls 70 correspond to substrate 12; intermediate strata 14, 16; cover stratum 18; and sidewalls 20, respectively. Cover stratum 68 is attached to filter stratum 66 by means of an epoxy cement 72. An epoxy cement stratum 74 is applied to the outer surface of metallized sidewalls 70 in registration with the entire edges of stratum 66 and cement 72 and a portion of the edges of cover stratum 68 and substrate 64. A metallized film 75 which is composed of a material similar to metallized sidewalls 20 is deposited on the exposed surfaces of cement stratum 74 and sidewalls 70. Metallized film 75 provides an additional protecting stratum in the event of pinholes in metallized sidewalls 70.

Figure 6:
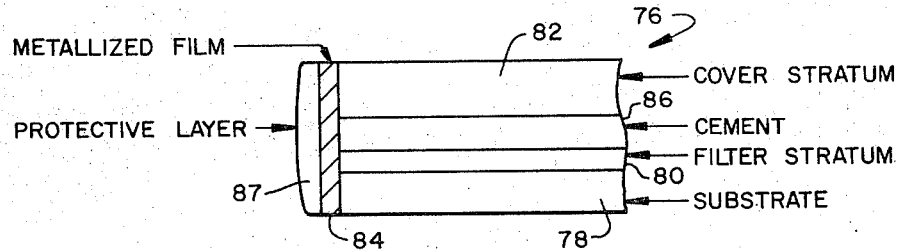
FIG. 6 is a sectional view in side elevation of a fourth embodiment of the invention.

In FIG. 6, an optical thin film filter 76 comprises a base substrate 78, a filter stratum 80, a cover stratum 82, and metallized sidewalls 84. Base substrate 78; filter stratum 80; cover stratum 82; and metallized sidewalls 84 correspond to substrate 12; intermediate strata 14, 16; cover stratum 18; and sidewalls 20, respectively. Cover stratum 82 is attached to filter stratum 80 by means of an epoxy cement 86. A polymeric stratum 84, for example, a thermoplastic such as an epoxy resin, is applied to the exposed surface of sidewalls 84 to protect sidewalls 84 from abrasion and contaminants.

Figure 7:
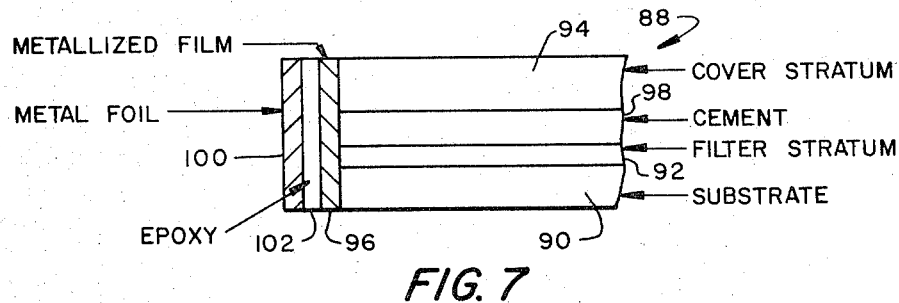
FIG. 7 is a sectional view in side elevation of a fifth embodiment of the invention.

In the embodiment shown in FIG. 7, an optical thin film 88 comprises a base substrate 90, a filter stratum 92, a cover stratum 94, and metallized sidewalls 96. Base substrate 90; filter stratum 92; cover stratum 94; and metallized sidewalls 96 correspond to substrate 12; intermediate strata 14, 16; cover stratum 18; and sidewalls 20, respectively. Cover stratum 94 is attached to filter stratum 92 by means of an epoxy cement 98. A metal foil stratum 100 is attached to the exposed surface of sidewalls 96 by means of an epoxy cement 102. Metal foil stratum 100 is provided as a protective stratum in a manner similar to polymeric stratum 86.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method for making an optical thin film filter protected against deterioration from humidity comprising the steps of:
   a. vapor depositing a stratum of alternating layers of high and low index of refraction materials on a base stratum;
   b. mounting a cover stratum on said alternating layer stratum; and
   c. vapor depositing a water impermeable metalized film on the exposed edges of said base stratum, said alternating layer stratum, and said cover stratum.

2. The method as claimed in claim 1 wherein said vapor depositing said water impermeable metalized film includes the steps of:
   a. masking the exposed faces of said base stratum and said cover stratum;
   b. mounting said base stratum, said alternating layer stratum, and said cover stratum on a support in a bell jar with one edge of said base stratum, said alternating layer stratum, and said cover stratum in registration with a receptacle containing a charge of metal;
   c. evacuating said bell jar;
   d. evaporating said charge of metal by heating said receptacle;
   e. depositing said metal on said exposed edge in registration with said receptacle;
   f. rotating said strata until the remaining exposed edges are sequentially registered with said receptacles and depositing said meatl on said exposed edges when so registered.

3. The method as claimed in claim 1 including the step of applying an epoxy cement stratum to the exposed edges of said base stratum, alternating layer stratum, and said cover stratum prior to vapor depositing the water impermeable metalized film.

4. A method for making an optical thin film filter protected against deterioration from humidity comprising the steps of:
   a. vapor depositing a first stratum of alternating layers of high and low index of refraction dielectric materials on a base stratum;
   b. vapor depositing a second stratum of alternating layers of high and low index of refraction dielectric materials on said first stratum;
   c. mounting a cover stratum on said second stratum; and
   d. vapor depositing a water impermeable metalized film on the exposed edges of said base stratum, said first and second strata, and said cover stratum.

5. The method as claimed in claim 4 wherein the thickness of each of said alternating layers is one-quarter wavelength.

6. The method as claimed in claim 5 wherein said first and second strata are separated by a one-half wavelength dielectric gap.

* * * * *